(12) United States Patent
Wang

(10) Patent No.: US 9,718,326 B2
(45) Date of Patent: Aug. 1, 2017

(54) DEVICE AND METHOD FOR HEATING AND COOLING STORAGE CONTAINERS

(71) Applicant: Cheng-Shung Wang, Taipei (TW)

(72) Inventor: Cheng-Shung Wang, Taipei (TW)

(*) Notice: Subject to any disclaimer, the term of this patent is extended or adjusted under 35 U.S.C. 154(b) by 0 days.

(21) Appl. No.: 15/060,556

(22) Filed: Mar. 3, 2016

(65) Prior Publication Data

US 2016/0288611 A1    Oct. 6, 2016

(30) Foreign Application Priority Data

Apr. 1, 2015   (TW) .............................. 104204905 U

(51) Int. Cl.
*B60H 1/00* (2006.01)
*B60N 3/10* (2006.01)

(52) U.S. Cl.
CPC ..... *B60H 1/00271* (2013.01); *B60H 1/00592* (2013.01); *B60N 3/104* (2013.01); *B60H 2001/00307* (2013.01)

(58) Field of Classification Search
CPC ....................... B60H 1/00592; B60H 1/00271
USPC .................................. 62/244, 457.9; 165/41
See application file for complete search history.

(56) References Cited

U.S. PATENT DOCUMENTS

| | | |
|---|---|---|
| 4,103,510 A | 8/1978 | Hall |
| 4,483,151 A | 11/1984 | Fujioka et al. |
| 4,936,103 A | 6/1990 | Newman |
| 5,165,646 A | 11/1992 | Gewecke |
| 5,203,833 A | 4/1993 | Howell |
| 5,355,694 A | 10/1994 | Morrow |
| 5,839,293 A | 11/1998 | Teitelbaum |
| 5,950,436 A | 9/1999 | Tunkel et al. |
| 6,101,830 A | 8/2000 | Feuerecker |
| 6,438,982 B1 | 8/2002 | Duerr et al. |
| 7,007,494 B2 | 3/2006 | Al Rashidi |
| 7,043,926 B2 | 5/2006 | Smith |
| 7,726,143 B2 | 6/2010 | Marginean et al. |
| 7,780,212 B2 | 8/2010 | Hirata et al. |
| 7,891,203 B1 | 2/2011 | Burns et al. |
| 2005/0204763 A1 | 9/2005 | Smith |
| 2006/0076379 A1 | 4/2006 | Hussaini et al. |
| 2008/0148752 A1 | 6/2008 | Marginean |

FOREIGN PATENT DOCUMENTS

| | | |
|---|---|---|
| CA | 458173 A | 7/1949 |
| CN | 1066400 C | 5/2001 |
| CN | 2679602 Y | 2/2005 |
| CN | 200510034083.7 | 10/2006 |
| CN | 102700839 A | 10/2012 |
| CN | 103453630 A | 12/2013 |
| EP | 0865962 A1 | 9/1998 |

(Continued)

*Primary Examiner* — Ruth Ilan
(74) *Attorney, Agent, or Firm* — Marsh Fischmann & Breyfogle LLP; Jonathon A. Szumny

(57) ABSTRACT

A device comprising a first storage compartment, an inlet pipe connected to the storage compartment, the inlet pipe adapted to deliver conditioned air from a heating, ventilating, and air conditioning (HVAC) system of a motor vehicle to the storage compartment, a first outlet pipe connected to the storage compartment for directing the conditioned air back into the HVAC system, a second storage compartment, and a second outlet pipe connected to the second storage compartment for directing the conditioned air into the second storage compartment.

17 Claims, 5 Drawing Sheets

(56) References Cited

FOREIGN PATENT DOCUMENTS

| EP | 1502781 A2 | 2/2005 |
|---|---|---|
| WO | 0013935 A1 | 3/2000 |
| WO | 04000603 A1 | 12/2003 |
| WO | 2007042162 A1 | 4/2007 |
| WO | 2007088286 A2 | 8/2007 |

DEVICE AND METHOD FOR HEATING AND COOLING STORAGE CONTAINERS

CROSS-REFERENCE TO RELATED APPLICATIONS

The present application claims the benefit of priority to Taiwanese Patent Number M505421 having Application Serial Number 104204905, filed Apr. 1, 2015, titled "SIMPLE IN-VEHICLE HEATING AND COOLING BOX DESIGN DEVICE ASSEMBLY", which is hereby incorporated by reference in its entirety.

FIELD

The present invention relates generally to heating and cooling of storage containers and more particularly, to heating and cooling of storage containers using a motor vehicle's heating, ventilating, and air conditioning (HVAC) system.

BACKGROUND

Many people rely on motorized vehicles for transportation. A common problem associated with operating a motorized vehicle is fatigue, which is a leading cause of accidents worldwide. When an operator of a motorized vehicle becomes drowsy or otherwise impaired, dangerous results can occur.

Another problem faced by drivers of motorized vehicles is in regards to transporting perishable goods, such as food or drink. Some perishable goods require a controlled temperature while being transported in order to maintain premium quality.

Accordingly, there is a need for a device and method of keeping a driver awake and aware while also transporting perishable goods at a controlled temperature that overcomes the shortcomings stated above.

SUMMARY OF THE INVENTION

The present invention aims to address the above-cited limitations by providing the ability to heat or cool contents of a container using a motor vehicle's HVAC system. The container is coupled to the motor vehicle's HVAC system such that the temperature of the contents of the container can be controlled using the motor vehicle's HVAC system.

The contents of this summary section are provided only as a simplified introduction to the invention, and are not intended to be used to limit the scope of the appended claims. The present disclosure has been described above in terms of presently preferred embodiments so that an understanding of the present disclosure can be conveyed. However, there are other embodiments not specifically described herein for which the present disclosure is applicable. Therefore, the present disclosure should not be seen as limited to the forms shown, which should be considered illustrative rather than restrictive.

An exemplary embodiment of a device comprises a first storage compartment, an inlet pipe connected to the storage compartment, the inlet pipe adapted to deliver conditioned air from a heating, ventilating, and air conditioning (HVAC) system of a motor vehicle to the storage compartment, a first outlet pipe connected to the storage compartment for directing the conditioned air back into the HVAC system, a second storage compartment, and a second outlet pipe connected to the second storage compartment for directing the conditioned air into the second storage compartment.

In related versions, the first storage compartment is hermetically sealed.

In related versions, the first storage compartment comprises a metallic lining.

In related versions, the first storage compartment comprises a plurality of sub-compartments.

In related versions, the first storage compartment comprises a removable meshed metal layer.

In related versions, the inlet pipe comprises a control valve for controlling a direction of air flow.

In related versions, the second storage compartment comprises an air pressure control aperture.

An exemplary embodiment of a device comprises a first storage compartment comprising an inlet port, a first outlet port, and a second outlet port, an inlet pipe connected to the storage compartment at the inlet port, the inlet pipe adapted to deliver conditioned air from a heating, ventilating, and air conditioning (HVAC) system of a motor vehicle to the storage compartment, a first outlet pipe connected to the first outlet port of the storage compartment for directing the conditioned air back into the HVAC system, a second storage compartment comprising a second inlet port, and a second outlet pipe connected at a first end to the second outlet port of the first storage compartment and at a second end to the second inlet port of the second storage compartment for directing the conditioned air into the second storage compartment.

In related versions, the first storage compartment is hermetically sealed.

In related versions, the first storage compartment comprises a metallic lining.

In related versions, the first storage compartment comprises a plurality of sub-compartments.

In related versions, the first storage compartment comprises a removable meshed metal layer.

In related versions, the inlet pipe comprises a control valve for controlling a direction of air flow In related versions, the second storage compartment comprises an air pressure control aperture.

An exemplary embodiment of a method of keeping a motor vehicle operator awake and aware comprises connecting a first storage compartment to a heating, ventilating, and air conditioning (HVAC) system of a motor vehicle, directing conditioned air from the HVAC system into the first storage compartment, directing the conditioned air from the first storage compartment back in to the HVAC system, and maintaining a desired temperature within the first storage compartment.

In related versions, the method further comprises connecting a second storage compartment to the first storage compartment.

In related versions, a wet towel is stored within the first storage compartment.

In related versions, the method further comprises applying the wet towel to the face or body of the motor vehicle operator to keep the motor vehicle operator awake and aware.

In related versions, the second storage compartment comprises an air pressure control aperture.

In related versions, the first storage compartment is hermetically sealed.

BRIEF DESCRIPTION OF THE DRAWINGS

Other systems, methods, features and advantages of the present invention will be or will become apparent to one of ordinary skill in the art upon examination of the following figures and detailed descriptions. It is intended that all such additional apparatuses, systems, methods, features and advantages be included within this description, be within the scope of the present invention, and be protected by the appended claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Figure 1:
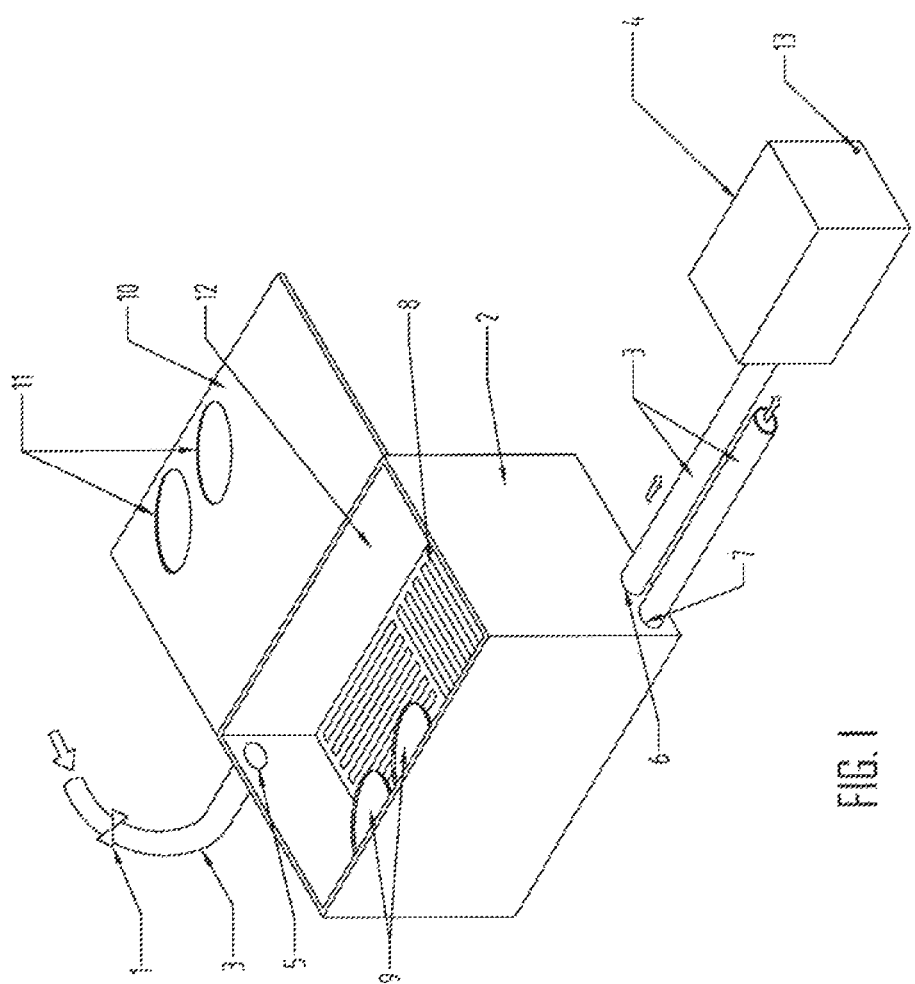
FIG. 1 is a perspective view of a device for heating and cooling storage containers.
Figure 2:
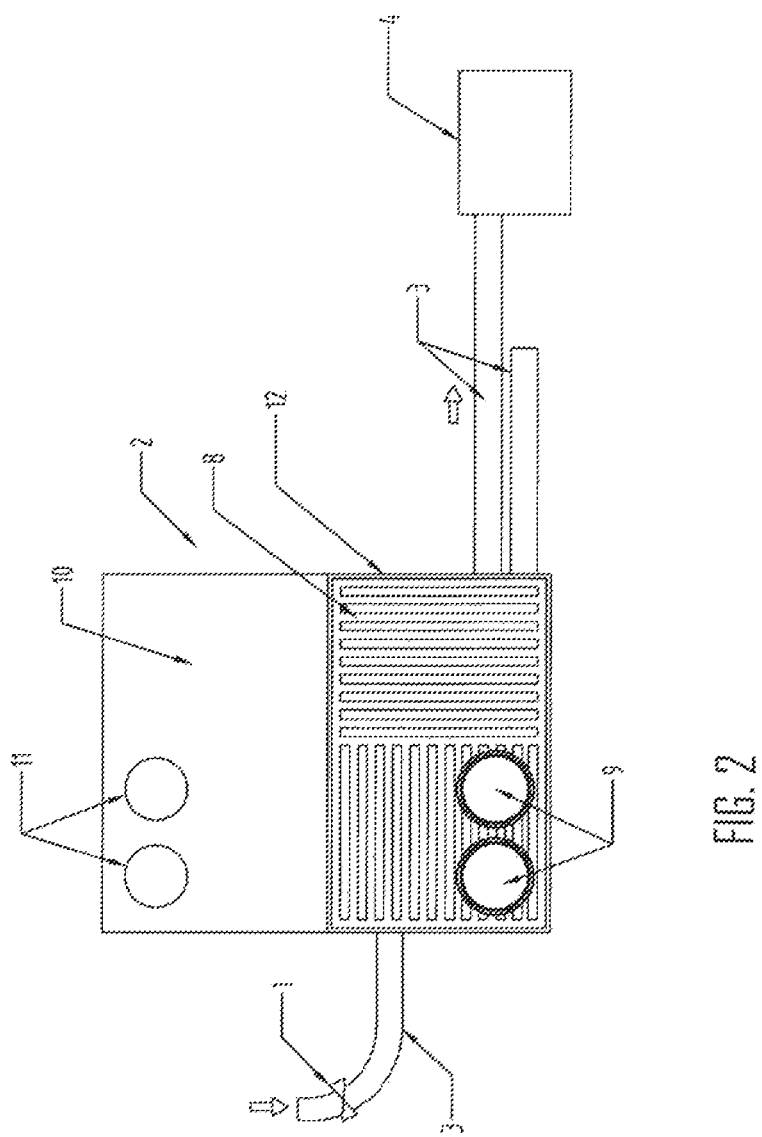
FIG. 2 is a top view of the device of FIG. 1.
Figure 3:
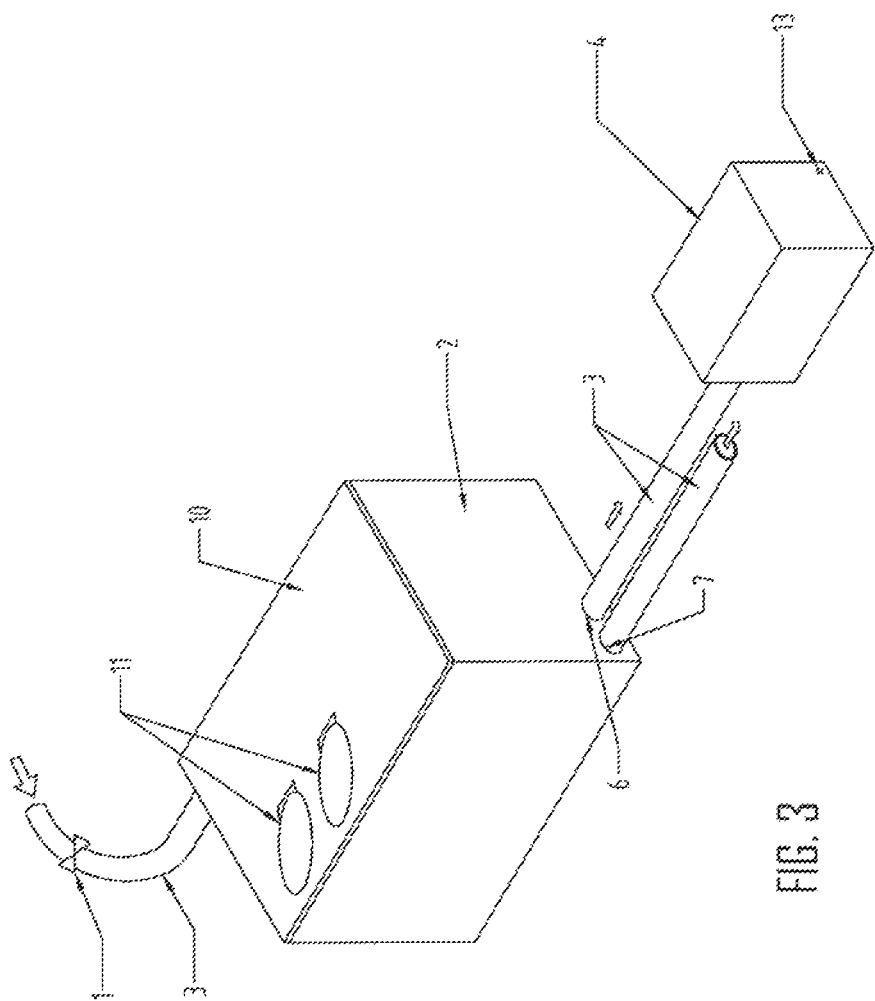
FIG. 3 is an alternative perspective view of the device of FIG. 1, wherein the cover of the first storage compartment and seal caps of openings are closed.
Figure 4:
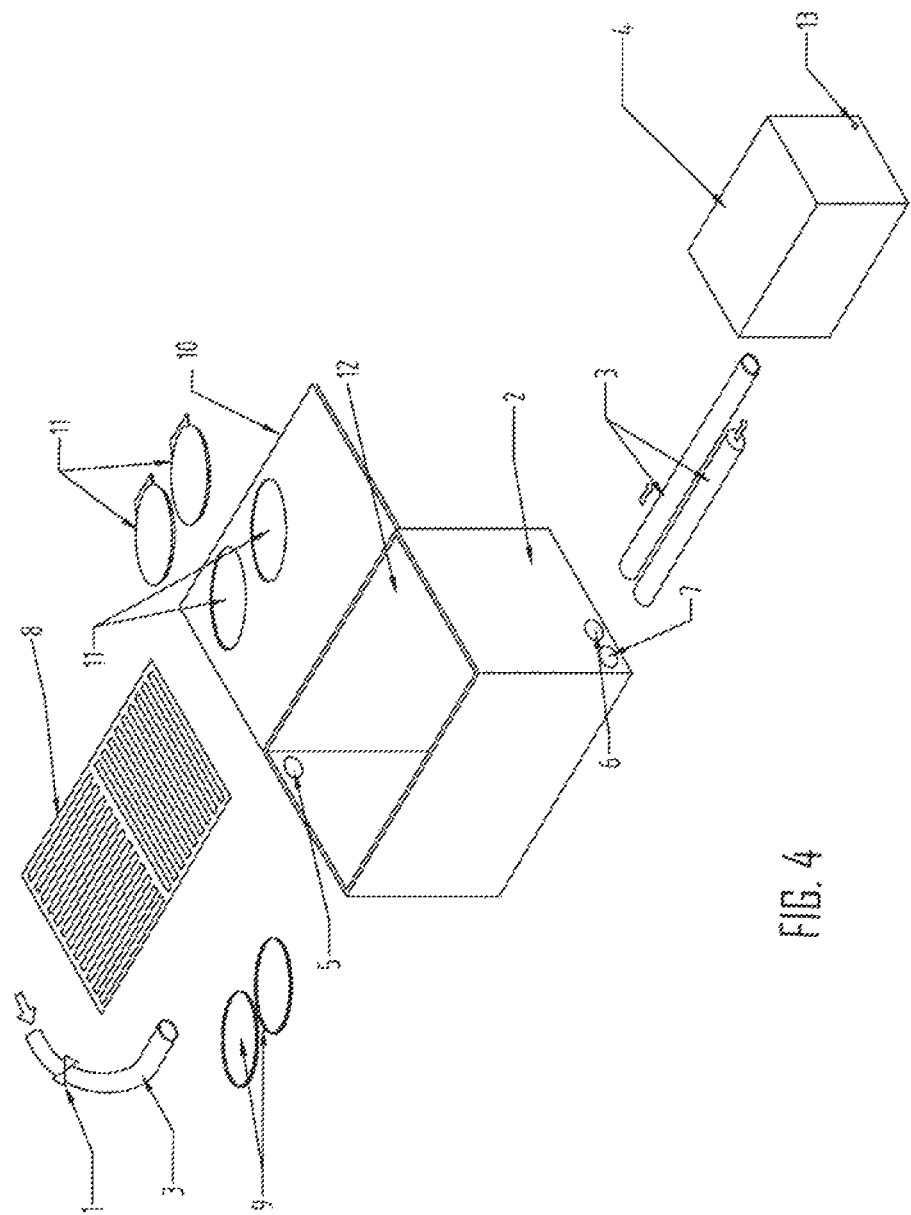
FIG. 4 is an exploded perspective view of the device of FIG. 1.

FIGS. 1-4 illustrate various views of a device for heating and cooling storage containers according to certain versions described herein. The device represents a novel way of heating and cooling the contents of a storage container by connecting the storage container to an HVAC system of a motorized vehicle. The heated or cooled contents can then also be used to keep an operator of the motor vehicle awake and aware. For example, a hot or cold drink, or a hot or cold towel can be housed within the storage container and used by the driver to stay awake without taking a break from driving.

As illustrated in FIGS. 1-4, the device comprises an air distribution valve 1, a built-in hermetic storage compartment 2 having a cover 10, connecting pipes 3, and a portable storage container 4 having an air adjustment hole 13.

Storage compartment 2 can further comprise inlet and outlet apertures 5-7 of identical size, and a removable meshed metal screen 8 with two circular pads 9 sized to accommodate soda cans, or otherwise having two shallow indentations on it. A control switch can activate the conditioned air distribution valve 1 at the HVAC, causing conditioned air that is produced from the HVAC to be redirected to the storage compartment 2. When the control switch is not activated, the HVAC of the motor vehicle operates normally. The control switch can be conveniently installed on the dashboard of the motor vehicle by itself or as an additional selection option on the vehicle's existing A/C control hub.

When the control switch is turned on to activate the air distribution valve 1, the conditioned air from the vehicle will be directed to flow through the connecting pipe 3 and inlet 5, into the storage compartment 2. The storage compartment 2 can be physically built into a vehicle using standard processes during manufacturing, and hermetically sealed, and can be located between the front row seats, next to the vehicle driver. Inside the hermetic compartment 2, a removable meshed metal screen 8 with two circular pads 9 is used to divide the compartment 2 into two parts, an upper portion and a lower portion. One hole can be inlet 5 located on the upper portion, and directs the conditioned air flow into the compartment 2, while the other two holes function as outlets 6-7 located on the lower portion.

In related versions, the outlet 6 directs a part of the conditioned air in the compartment 2 to flow out to portable storage container 4, while the other outlet 7 directs the remaining part of the conditioned air in the compartment to flow back to the vehicle's original HVAC system to blow out from outlets located on the vehicle's dashboard.

In related versions, the portable storage container 4 is located in the trunk of the motor vehicle, and can be removable depending on whether there is a need to use the portable storage container 4. For example, outlet 6 can be located in the trunk, and can be detachable from the portable storage container 4. A user can detach portable storage container 4 and use it as a shopping basket, or otherwise to store items. If the user wishes to either heat or cool the contents, the portable storage container 4 can be attached to outlet 6. Otherwise, outlet 6 is capped off, and the air circulates back into the HVAC system without coming out from outlet 6.

A thin layer of stainless steel 12 or similar material can be used to cover the entire interior wall of the hermetic compartment 2 to speed up absorption and prolong preservation of the conditioned air within the compartment 2. The cover 10 of hermetic compartment 2 can comprise openings, sized to accommodate a soda can or other beverage, and can further comprise seal caps 11. Both openings 11 and seal caps 11 can be positioned to align with the two circular pads 9 on the metal screen layer 8. For example, a wet towel and food can be placed on the metal screen layer 8, and drink cans can be placed on the circular pads 9 through uncapped openings 11. The hermetic storage compartment 2 can be completely sealed by closing the cover 10 and two seal caps 11, when not in use.

In operation, the amount of conditioned air flowing into the hermetic storage compartment 2 should be equal to the amount flowing out. Therefore, after the portable storage container 4 is full of conditioned air, the identical size of inlet 5 and outlet 7 allow the rate and amount of conditioned air flowing into the hermetic storage compartment 2 to be equal to the amount flowing out thru the connecting pipe 3 back to the HVAC system of the vehicle, finally blowing out from outlets on the vehicle dashboard. Therefore, the temperature and pressure inside the hermetic storage compartment 2 will remain at steady state without concern for the air being too hot/cold or too high/low pressure inside the compartment 2.

While the conditioned air flowing into the compartment through upper inlet 5 and flowing out thru lower outlets 6 and 7 automatically keeps the conditioned air in compartment 2 flowing fresh, the adjustable air adjustment hole 13 located at the portable container 4 can slowly release air from the container to keep the conditioned air in the portable container 4 fresh.

The portable storage container 4 should have an inlet port with proper adopting means to hook up with piping outlet 6 to the hermetic storage compartment 2. Also, similar to the hermetic storage compartment 2, the portable storage container 4 can have a thin layer of stainless steel or similar material to cover the entire interior wall to speed up absorption and prolong preservation of the conditioned air within the container. In related versions, the storage compartment 2 can be sized to fit in the space between the driver's seat and the front passenger's seat in a motor vehicle. In related versions, the storage compartment 2 can be integrated into, or replace, the center compartment that is typically located in the space between the driver's seat and the front passenger's seat in a motor vehicle.

For convenience, multiple air flow piping outlets 6 with seal caps for connecting with portable storage containers 4, can be extended and installed at a plurality of locations, including front passenger side, rear passenger row seats, and inside the trunk of the motor vehicle. Each outlet port can be sealed by a cap when not in use. For example, when the vehicle is full of passengers, the portable food storage container 4 can be placed in the trunk and be hooked up with an outlet port installed in the trunk. In related versions, a maximum of three portable storage containers can be used at the same time if needed, for example, when the vehicle is only occupied by the driver alone.

As mentioned earlier, in the event a vehicle operator becomes drowsy, the operator often craves a wet and hot or cold towel to wipe their face, eyes, and body. The operator may also crave a hot or cold drink as well to help prevent the driver's fatigue, while driving alone daily after work or a long trip driving during hot summers and cold winters. As provided in this and related versions, the conditioned wet towel and drinks in the hermetic storage compartment 2 are situated in a conveniently accessible position, without the need to stop the vehicle to rest or diverting the driver's attention. As stated before, this may help reduce the risk of vehicular accidents, which may be caused by driver's fatigue and increasing the overall safety of highway traffic if adoption of these features are mass produced in motor vehicles.

Advantages include, the device is easy to implement, and convenient to use. In practical application, if the device and method are adopted in a motor vehicle, only 4 simple steps are required for use: 1) get in the motor vehicle, 2) turn on the engine, 3) turn on the A/C, and 4) toggle the air control valve by selecting to have the air flow through the hermetic storage compartment. As the air gets diverted through the storage compartment and the portable storage container, a wet towel or beverage placed in either the storage compartment or the portable container will be ready for use within just 1-3 minutes, either in a heated or cooled state. Warm items would require a little longer due to delays in waiting for the engine of the vehicle to become hot. Also, depending on the beverage, certain drinks can be heated or cooled in a slightly longer or shorter time.

The device can be made from various materials known in the art such as, but not limited to, plastics, metals, alloys, wood, and the like, and can be sized and shaped in various different ways for better incorporation with standard production designs of each individual model and make of vehicles during manufacturing.

In related versions, the device can be utilized in all different types of motor vehicles, including, but not limited to, passenger cars, sport utility vehicles (SUVs), minivans, trucks, and 18-wheelers.

Figure 5:
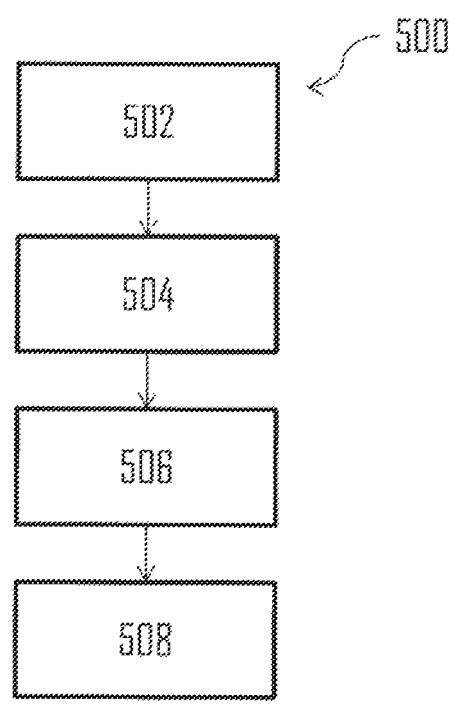
FIG. 5 is a flowchart depicting an exemplary embodiment of a method for keeping an operator of a motor vehicle awake and aware.

FIG. 5 is a flowchart depicting an exemplary embodiment of a method for keeping a motor vehicle operator awake and aware.

As shown in FIG. 5, method 500 comprises steps 502 to 508. At step 502, a first storage compartment is connected to a heating, ventilating, and air conditioning (HVAC) system of a motor vehicle. The connection can be accomplished according to the above-described means in relation to FIGS. 1-4.

At step 504, conditioned air is directed from the HVAC system into the first storage compartment.

At step 506, the conditioned air is directed from the first storage compartment back in to the HVAC system.

At step 508, a desired temperature is maintained within the first storage compartment.

In related versions, the method 500 can further comprise connecting a second storage compartment to the first storage compartment.

In related versions, a wet towel is stored within the first storage compartment.

In related versions, the method can further comprise applying the conditioned wet towel to the face or body of the motor vehicle operator to keep the motor vehicle operator awake and aware.

In related versions, the second storage compartment comprises an air pressure control aperture.

In related versions, the first storage compartment is hermetically sealed.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that scope shall not be restricted.

What is claimed is:

1. A heating/cooling container system for a vehicle comprising:
    a built-in hermetic storage compartment having an inlet and at least a first and a second outlet, the inlet being coupled to a heating, ventilating, and air conditioning (HVAC) system of the vehicle via a first conduit for introducing a conditioned air flow from the HVAC system into the built-in hermetic storage compartment, the first outlet being coupled to the HVAC system via a second conduit for directing the conditioned air flow from the built-in hermetic storage compartment to the HVAC system;
    an air distribution valve coupled to the first conduit;
    a control switch functionally coupled to the air distribution valve for controlling the conditioned air flow from the HVAC system into the hermetic storage compartment; and
    at least one portable storage container coupled to the second outlet of the hermetic storage compartment for receiving the conditioned air flow therefrom.

2. The container system of claim 1 wherein the hermetic storage compartment further comprises a metallic interior wall.

3. The container system of claim 1 wherein the hermetic storage compartment further comprises:
    at least one removable layer of screen dividing said compartment into at least an upper section and a lower section.

4. The container system of claim 3 wherein the hermetic storage compartment further comprises a cover.

5. The container system of claim 4 wherein a top layer of the at least one removable layer of screen comprises at least one can seat pad.

6. The container system of claim 5 wherein the cover comprises at least one opening thereon, each opening being at a location corresponding to one of the at least one can seat pad.

7. The container system of claim 6 wherein the hermetic storage compartment further comprises at least one sealable cap for sealably closing the at least one opening.

8. The container system of claim 4 wherein a top layer of the at least one removable layer of screen comprises at least one shallow hollow indent.

9. The container system of claim 8 wherein the cover comprises at least one opening thereon, each opening being at a location corresponding to one of the at least one shallow hollow indent.

10. The container system of claim 1 wherein the hermetic storage compartment is a built-in compartment fixed at a location in the vehicle.

11. The container system of claim 1 wherein the hermetic storage compartment is located between two adjacent front-row seats.

12. The container system of claim 1 wherein the hermetic storage compartment is located between two adjacent front-row seats and next to the driver's seat.

13. The container system of claim 1 wherein the at least one portable storage container further comprises a metallic interior wall.

14. The container system of claim 1 wherein the at least one portable storage container further comprises at least one air adjustment port.

15. The container system of claim 1 wherein the control switch controls the air distribution valve for allowing or disallowing the conditioned air flow to flow into the hermetic storage compartment.

16. The container system of claim 1 wherein the air distribution valve controls a direction of air flow.

17. The container system of claim 1 wherein the at least one portable storage container further comprises an air pressure control aperture.

* * * * *